(12) United States Patent
Napier

(10) Patent No.: US 6,606,863 B2
(45) Date of Patent: Aug. 19, 2003

(54) SIMPLIFICATION OF ENGINE CORE REMOVAL FOR MAINTENANCE OF GAS TURBINE ENGINE

(75) Inventor: Larry Wayne Napier, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 52 days.

(21) Appl. No.: 09/957,589

(22) Filed: Sep. 20, 2001

(65) Prior Publication Data

US 2003/0051483 A1 Mar. 20, 2003

(51) Int. Cl.7 ................................................ F02C 1/00
(52) U.S. Cl. ..................... 60/772; 415/216.1; 416/174
(58) Field of Search ................ 60/262, 772; 415/216.1, 415/230; 416/174, 244 A

(56) References Cited

U.S. PATENT DOCUMENTS

| | | | |
|---|---|---|---|
| 3,602,535 A | * 8/1971 | Behning | 287/53 |
| 3,631,688 A | * 1/1972 | Quick | 416/171 |
| 3,997,962 A | * 12/1976 | Kleitz et al. | 29/426.5 |
| 4,456,425 A | * 6/1984 | McCraty et al. | 415/122 |
| 4,982,628 A | 1/1991 | DiForte | 81/125 |
| 5,131,782 A | 7/1992 | Bruno et al. | 403/259 |
| 5,143,499 A | * 9/1992 | Bobo et al. | 411/247 |
| 5,395,271 A | 3/1995 | Tyler | 440/6 |
| 6,354,085 B1 | * 3/2002 | Howell et al. | 60/740 |

\* cited by examiner

*Primary Examiner*—Charles G. Freay
*Assistant Examiner*—John F. Belena
(74) *Attorney, Agent, or Firm*—Nathan D. Herkamp; Gregory A. Welte

(57) ABSTRACT

Apparatus for simplification of engine core removal for maintenance of gas turbine engines. Ordinarily, to remove a high-pressure compressor in a twin-spool engine, many components of the engine must be removed, such as parts of a booster, in order to gain access to a mounting nut which is threaded onto a shaft supporting the high-pressure compressor. The removal is necessary because the nut must be extracted from the engine after disengagement from the shaft. Under the invention, this removal-of-components is largely eliminated, by providing a stowage location for the nut within the engine. The nut is removed, and then threaded onto a set of threads specifically provided for storage of the nut, and for nothing else.

11 Claims, 5 Drawing Sheets

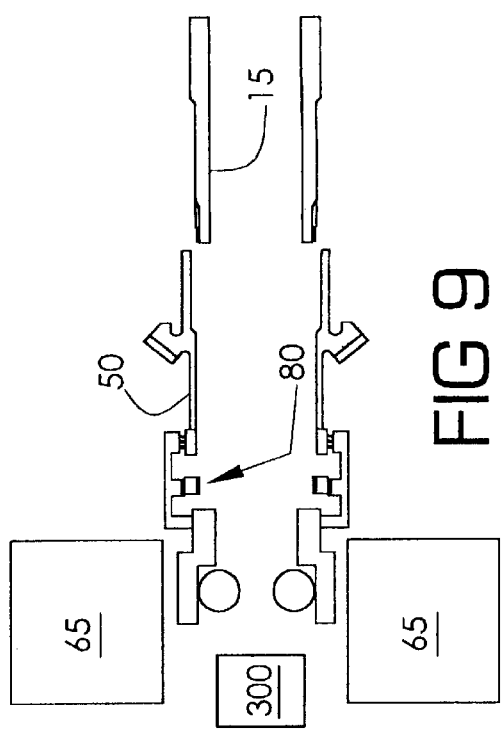
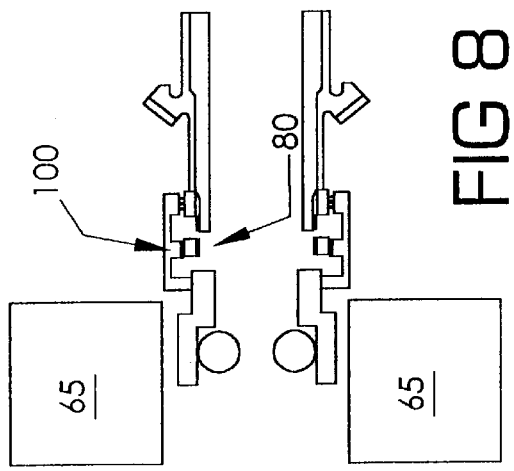
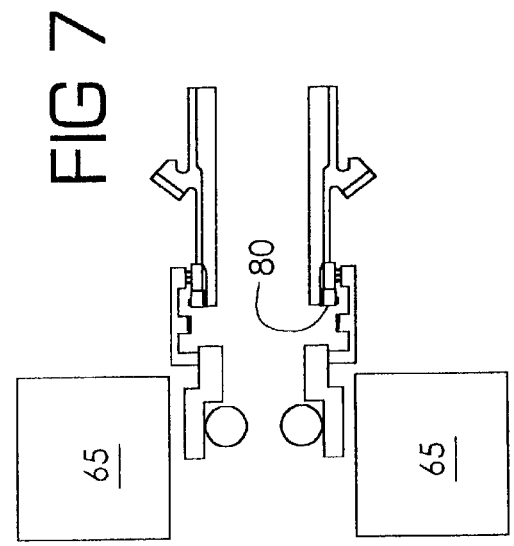
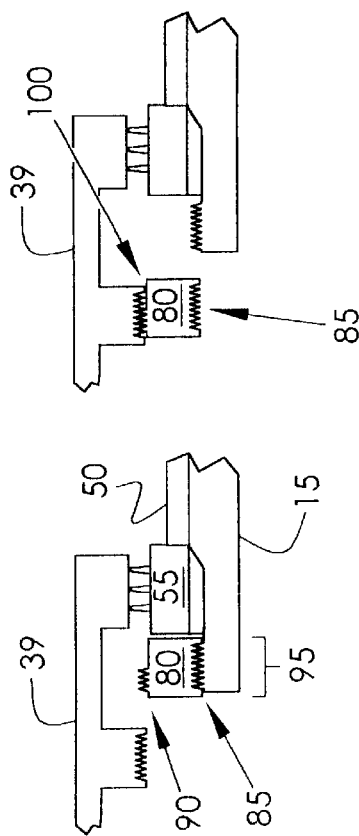

SIMPLIFICATION OF ENGINE CORE REMOVAL FOR MAINTENANCE OF GAS TURBINE ENGINE

TECHNICAL FIELD

The invention concerns a simplified approach to removal of the core from a gas turbine engine.

BACKGROUND OF THE INVENTION

FIG. 1 is a schematic of a twin spool gas turbine engine found in the prior art. Incoming air 1 is compressed by a booster 2, and then delivered to a high-pressure compressor 3, which further compresses the air and delivers the compressed air to a combustor 6. Fuel is added to the combustor 6 and ignited, producing a high-velocity gas stream 9.

The gas stream 9 is delivered to a high-pressure turbine 12, which extracts energy to drive the high-pressure compressor 3, through high-speed shaft 15. The gas stream 9 is then delivered to a low-pressure turbine 18, which extracts energy to drive the booster, through low-speed shaft 21, and to drive a fan 24. The fan produces thrust. indicated by arrow 27. Some additional thrust 28 is produced by the gas stream exiting the low-pressure turbine 18.

Bearings 30 support the high-speed shaft 15 on the low-speed shaft 21. Bearings 33 support the latter low-speed shaft 21 on stationary structures, not shown.

Maintenance and repairs are required on the engine, some of which require removal of the core of the engine. The core, indicated by dashed box 29, includes the high-pressure compressor 3, the high-pressure turbine 12, the shaft 15, and a casing 31 which contains these three elements. Typically, in the prior art, major disassembly of the engine is required for removal of the core 29.

The inventor has developed a strategy for removal of the core 29 which avoids the need for major disassembly of the engine.

SUMMARY OF THE INVENTION

In one form of the invention, a nut which locks a shaft in place in a gas turbine engine is equipped with a second thread. The second thread is used to engage another thread provided nearby, when the nut is removed. Thus, when the nut is removed from the shaft, it can be threaded onto the second thread, and need not be removed from the engine. The latter type of removal ordinarily requires removal of extensive amounts of additional components.

BRIEF DESCRIPTION OF THE DRAWINGS

FIGS. 5 and 6 illustrate one form of the invention.

FIGS. 7, 8, and 9 illustrate a sequence of events undertaken in one form of the invention.

DETAILED DESCRIPTION OF THE INVENTION

Figure 1:
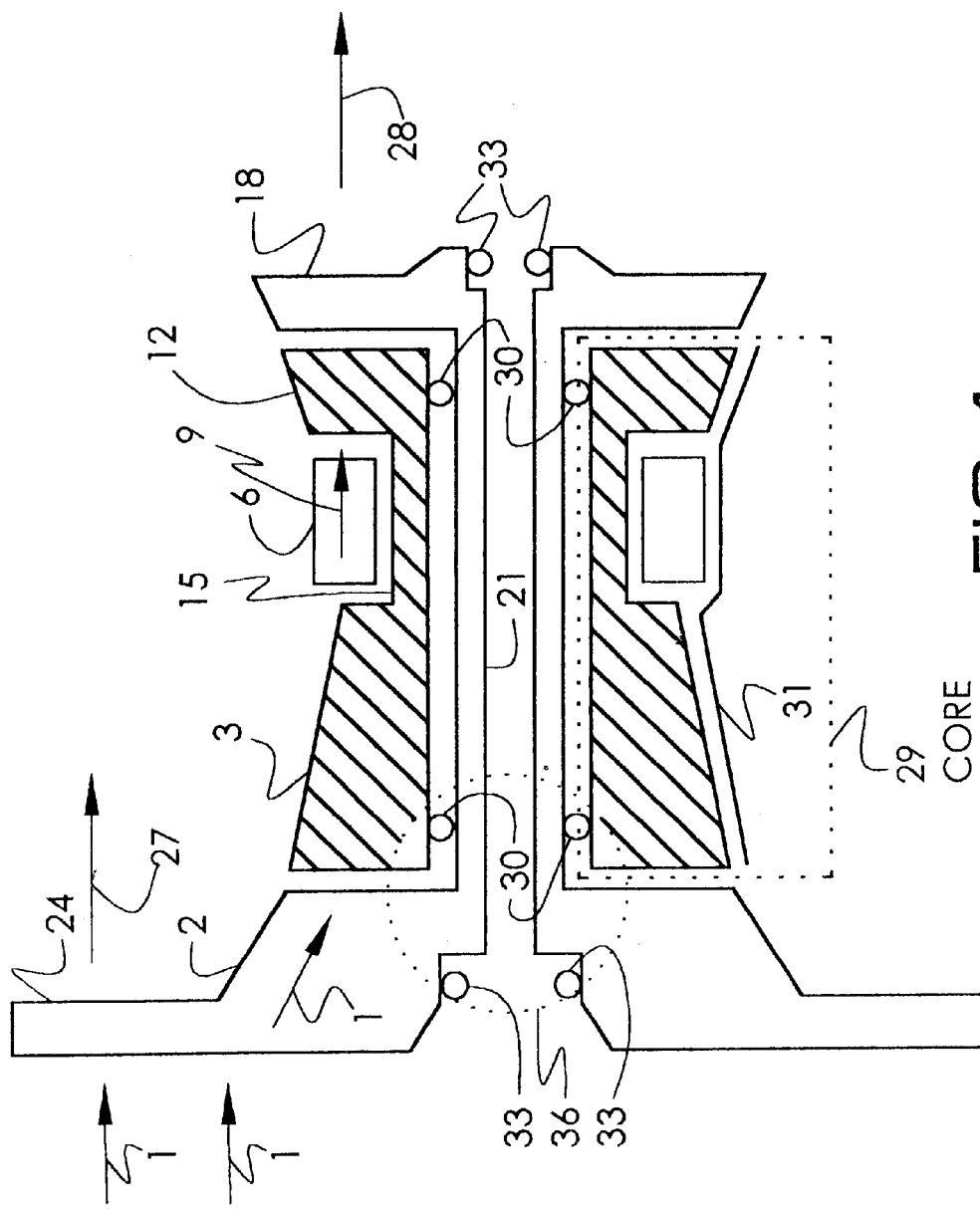
FIG. 1 is a schematic of a generic gas turbine engine.
Figure 2:
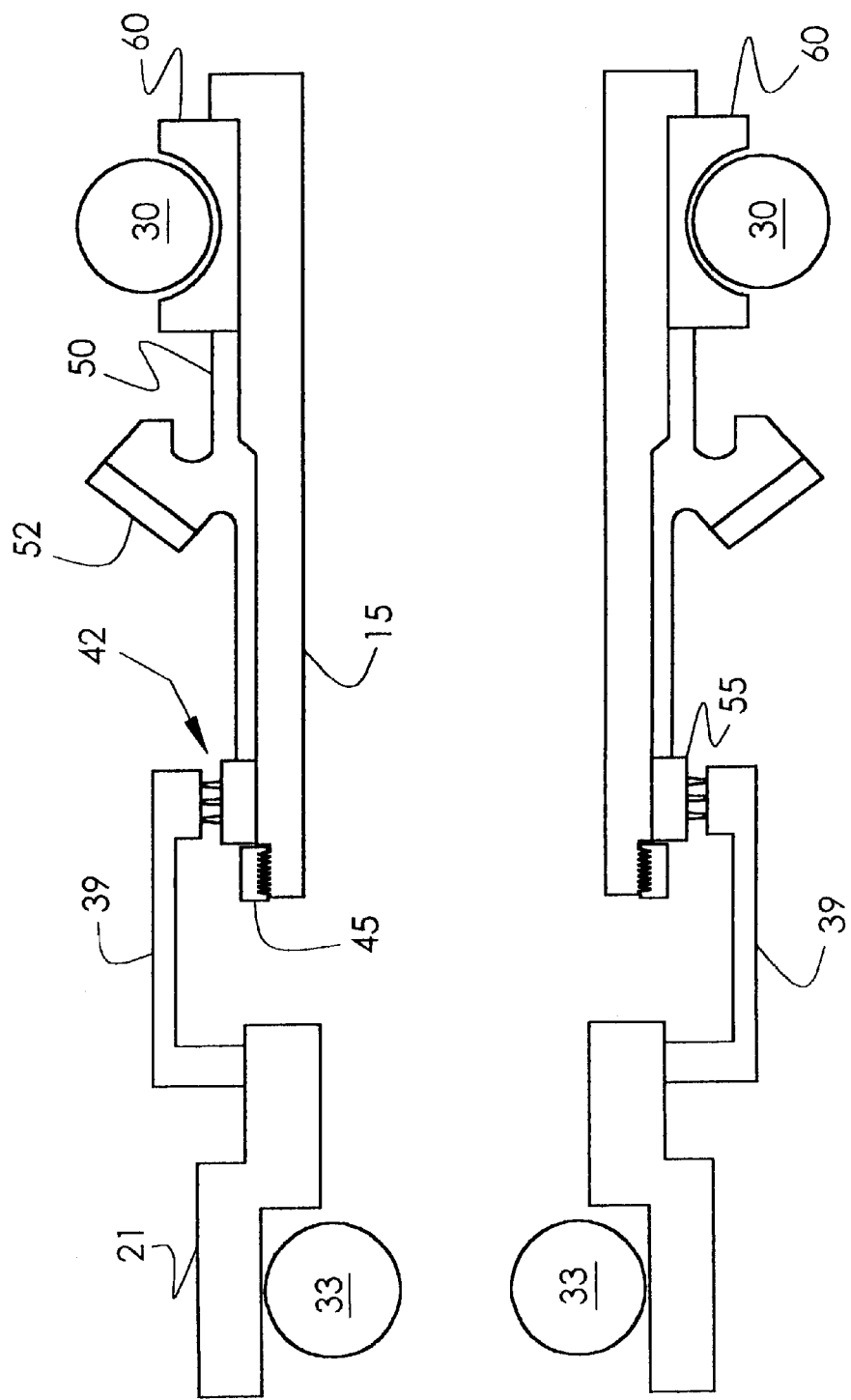
FIG. 2 illustrates components located generally within region 36 in FIG. 1.

FIG. 2 illustrates components found in the region generally designated 36 in FIG. 1, plus additional components. A seal 39 blocks fluid passage, and mates with the high-speed shaft 15 at rotating interface 42. A threaded nut 45, sometimes called a coupling nut, locks the high-speed shaft 15 into position, as perhaps best explained by reference to FIGS. 2 and 3 together.

Figure 3:
FIG. 3 illustrates some of the components of FIG. 2, in exploded form.

FIG. 3 illustrates several components in exploded view. FIG. 3 shows high-speed shaft 15, and a bevel ring gear 50. A gear tooth 52 is identified. The bevel ring gear 50 is used to extract power from the engine, to drive components such as electrical generators and hydraulic pumps, neither of which is shown. FIG. 3 also shows a seal 55 and the threaded nut 45.

When the components of FIG. 3 are assembled, as in FIG. 2, threaded nut 45 applies axial clamping force to drive the seal 55 against bevel ring gear 50, thereby locking shaft 15 in position.

Figure 4:
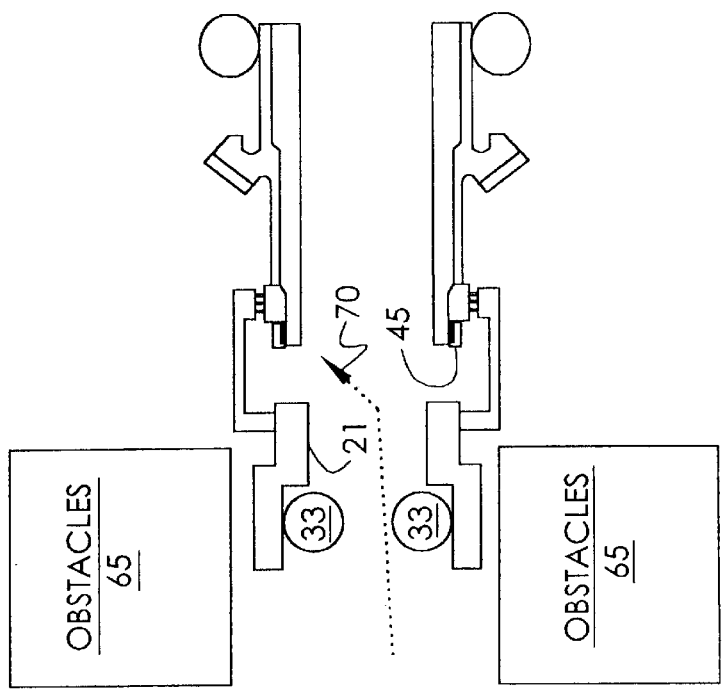
FIG. 4 illustrates obstacles 65 which block access to nut 45.

When one wishes to remove the core 29 of the engine, one must remove threaded nut 45. However, a problem arises, because access to the threaded nut 45 is blocked by obstacles 65 in FIG. 4. These include parts of the booster 2 in FIG. 1, and other components. Removal of these components is labor intensive, and thus removal of the core is an expensive operation.

The threaded nut 45 cannot be removed along path 70, because the diameter of bearing 33 is too small. It may be thought that bearing 33 could be re-designed with a larger diameter. That is possible in theory. However, in practice, bearing 33 is made in the smallest feasible diameter to minimize relative speeds of the bearing races, not shown.

The Inventor has developed a stratagem for eliminating the need to remove most, if not all, of the obstacles 65 which presently must be removed in order to extract the core 29 from the engine.

FIG. 5 illustrates some of the components shown in FIG. 2. In addition, FIG. 5 shows threaded nut 45 in modified form, and labeled 80. Threaded nut 80 is fabricated with two sets of threads. A set of internal threads 85, and a set of external threads 90. The internal threads 85 engage threads in region 95, which are formed in the high-speed shaft 15, and are used in normal operation.

If the core 29 is to be removed, the nut 80 is removed from high-speed shaft 15, and threaded onto an additional set of internal threads 100, as shown in FIG. 6. The additional threads 100 are supported, in this example, by seal 39.

FIGS. 7–9 illustrate a sequence of events undertaken in removal of the core 29. FIG. 7 shows the engine in assembled form. FIG. 8 shows the dual-threaded nut 80 removed from shaft 15, and stowed on threads 100. FIG. 9 shows shaft 15 being extracted from the bevel ring gear 50.

Several significant features and characterizations of the invention are the following. Thread 100, as well as external thread 90, in FIGS. 5 and 6, need not be designed to carry any significant load. These threads only support dual-threaded nut 80 during maintenance of the engine. The dual-threaded nut 80, in general, will weigh less than about ten pounds, and supporting it in a stationary state only requires overcoming the force of gravity.

From another point of view, in one form of the invention, either thread 90, 100, or both, are not designed to withstand any design load for which the thread 95, or thread 85, are designed. The latter threads 85 and 95 hold the high-speed shaft 15 in place during engine operation. The former threads 90 and 100 hold a nut in place during maintenance.

Thread 100 is of the same pitch, pitch diameter, and type as thread 90.

Thread 100 is shown as supported by seal 39 in FIG. 5. However, seal 39 is chosen because it is a structure conveniently located to thread 95. Other components can be used to support thread 100. In one form of the invention, a thread such as thread 100 can be located at any convenient station which is axially displaced from thread 95.

Figure 10:
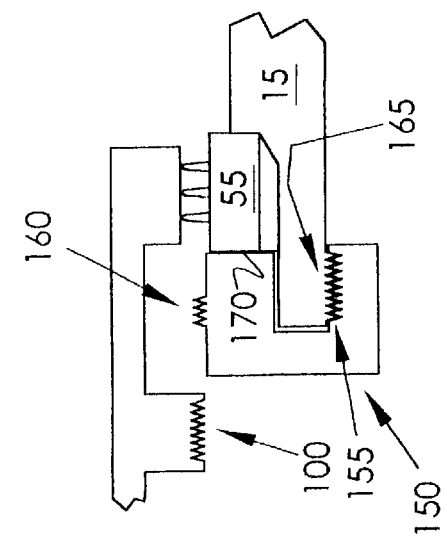

Threaded nut 80 is shown as bearing internal threads 85 which engage external threads 95 in FIG. 5. However, as stated above, nut 80 serves to apply axial force to a bearing race analogous to race 60 in FIG. 2. Consequently, other threading arrangements are possible. FIG. 10 illustrates one possibility.

Nut 150 contains two external threads 155 and 160. External thread 155 engages an internal thread 165 on shaft 15. Shoulder 170 applies axial force to seal 55 and the bevel ring gear 50 (not shown). Thread 160 engages thread 100 during maintenance.

It is observed that two functions are involved: locking high-speed shaft 15 into its operational position by applying axial force from nut 45 to bearing race 60 in FIG. 2, and securely storing nut 80 in FIG. 5 during maintenance. The former function can be accomplished by either an external or internal thread on shaft 15, with nut 80 being designed with a complementary thread.

The latter function can be accomplished by another thread, and the type of thread, external or internal, is not necessarily dictated by the type of thread used for the former function. That is, any of the following combinations of thread pairs can be used, wherein the first element of the pair represents the thread used to lock shaft 15 and the second element represents the thread used to stow the nut 80 during maintenance: (internal, internal) (internal, external), (external, internal) and (external, external).

In one form of the invention, threads 100 may not be necessary. Threads 100 may be replaced by a smooth surface, or annulus 250 in FIG. 11. The annulus 250 acts as a parking place for nut 255. During maintenance, annulus 250 surrounds the nut 255. Alternately, a smaller annulus 260 may be provided, as in FIG. 12. Nut 255 would slide onto annulus 260, like a ring on a rod. A stop 265 may be provided, and a similar stop may be provided in FIG. 11, to restrict axial travel of nut 255.

After nut 255 is positioned on the storage annulus 250 or 260 during maintenance, a retainer is added. For example, a snap-type retaining ring of C-configuration can be placed in a groove partially indicated by path 280. As another example, a pair of cotter keys, not shown, can be inserted through holes 290 in FIG. 12.

Figure 12:
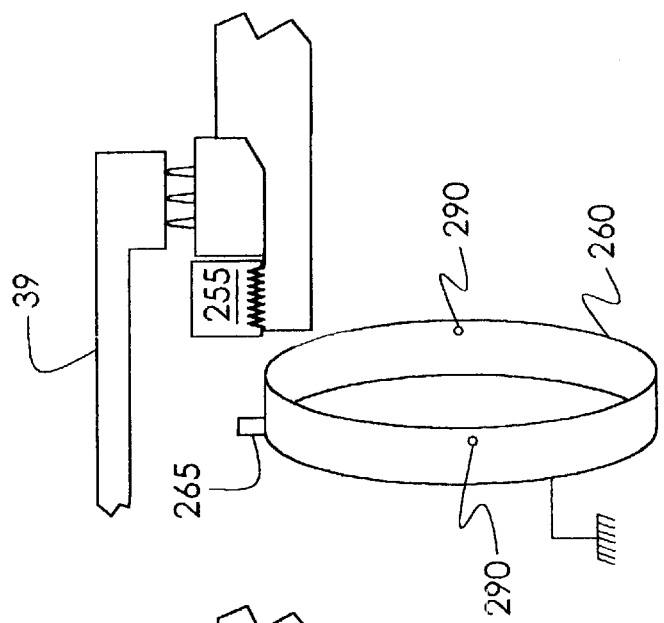
Figure 11:
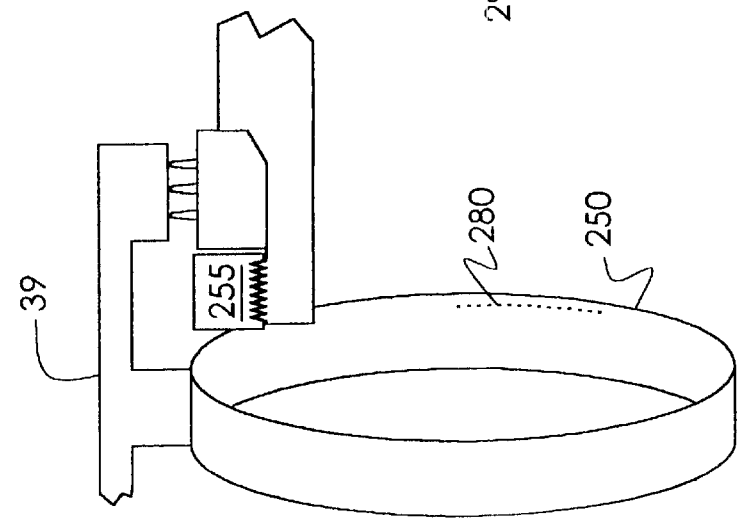

The forms of the invention shown in FIGS. 11 and 12 suffer the disadvantage that additional parts are required, namely, the retaining ring or cotter keys. However, cotter keys can be jury-rigged using simple electrical wire, which is expected to be found in nearly all maintenance shops.

In this connection, the Inventor points out that the specific embodiment shown in FIGS. 5 and 6 offers two specific advantages. One is that, since nut 80 is stowed within the engine, it is unlikely that the nut 80 will be misplaced. A second is that, since the internal thread 85 is fully exposed, it can be inspected, cleaned of dirt and debris, and lubricated, with the possible addition of corrosion inhibitor.

Thus, in one form of the invention, nut 80 is removed from the core as described above, stowed as shown in FIG. 6, and then inspected, cleaned, and lubricated.

One form of the invention comprises a particular process. A core of a gas turbine engine is transported to a disassembled gas turbine engine. The disassembled engine contains a nut in a stowed position. The core is inserted into the engine, the nut is withdrawn from its stowed position, and engaged with a thread on the core.

Sometimes, in the prior art, aircraft technicians have used nuts of the type 45 in FIG. 2 to apply axial force to the shaft 15, during insertion or withdrawal. In one form of the invention, this is preferably avoided. Instead, if axial force is required, a hydraulic jack, represented by block 300 in FIG. 9, is used.

Figure 13:
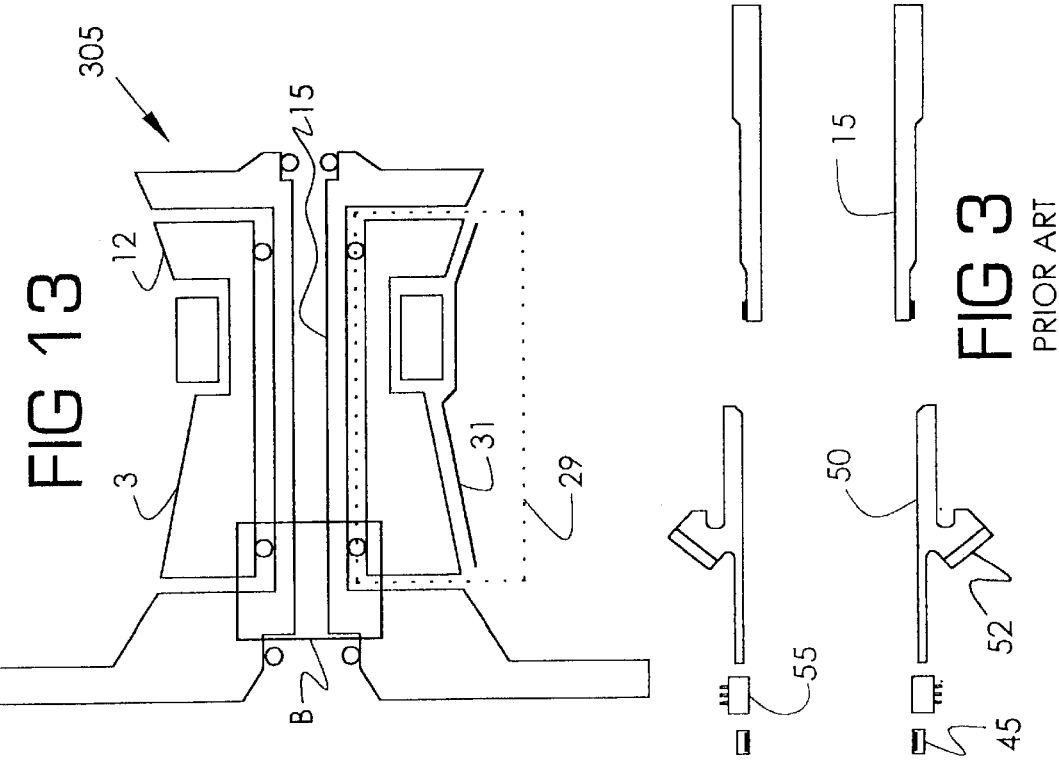
FIGS. 10, 11, 12, and 13 illustrate additional forms of the invention.

FIG. 13 illustrates one form of the invention. Block B represents the apparatus of one or more of FIGS. 5, 6, or 10, for example. FIG. 13 shows the engine 305, core 29, casing 31, high-pressure compressor 3, high-pressure turbine 12, and shaft 15.

Numerous substitutions and modifications can be undertaken without departing from the true spirit and scope of the invention. What is desired to be secured by Letters Patent is the invention as defined in the following claims.

What is claimed is:

1. Apparatus, comprising:
   a) a gas turbine engine containing a shaft which bears a shaft thread;
   b) a nut having a mating thread to the shaft thread;
   c) a second thread on the nut; and
   d) a thread mounted on a component of the engine, other than the shaft, of the same pitch, pitch diameter, and type as the second thread.

2. Apparatus, comprising:
   a) a gas turbine engine containing a shaft which bears a shaft thread;
   b) a nut having a mating thread to the shaft thread;
   c) a second thread on the nut; and
   d) a thread mounted on a component of the engine, other than the shaft, to which the nut is mountable using the second thread.

3. A method of removing a core from a gas turbine engine, the core including a casing within which lies a shaft bearing a high-pressure compressor and a high pressure turbine, the method comprising:
   a) removing a nut from the shaft;
   b) threading the nut onto a thread which is axially displaced from the core during normal engine operation; and
   c) withdrawing the core from the engine.

4. Method according to claim 3, wherein the nut is not used to apply axial force to the core, to assist withdrawal of the core.

5. A method, comprising:
   a) transporting a core to a partly disassembled gas turbine engine, which contains a nut in a stowed position;
   b) inserting the core into the engine; and
   c) removing the nut from the stowed position and threading the nut onto a shaft in the core.

6. Method according to claim 5, wherein the nut is not used to apply insertion force to the core.

7. Method according to claim 5, wherein removal of the nut from the stowed position comprises de-threading the nut from a thread.

8. Apparatus, comprising:
   a) a gas turbine engine which includes a core, which includes a casing within in which lies a shaft bearing a high-pressure compressor and a high pressure turbine;
   b) an annular seal axially displaced from the core;
   c) an internal thread on an inner surface of the annular seal;
   d) an external thread on the shaft; and
   e) a nut having inner threads and outer threads, such that
      i) when the nut is torqued to a predetermined level on the thread of the shaft, the core is held in an operative position; and
      ii) when the nut is stowed on the internal thread of the seal, the core is removable from the engine.

9. Method, comprising:
   a) removing a coupling nut from a shaft of a gas turbine engine;
   b) stowing the coupling nut on an annulus within the engine, such that internal threads of the coupling nut are fully exposed; and
   c) performing at least one of the following: inspecting, cleaning, and lubricating the coupling nut, while mounted on the annulus.

10. Method according to claim 9, wherein the coupling nut comprises internal threads which engage the shaft and external threads which contact the annulus.

11. Method according to claim 9, wherein the annulus comprises internal threads which engage the internal threads of the coupling nut.

* * * * *